United States Patent [19]

Shikler

[11] Patent Number: 5,495,884
[45] Date of Patent: Mar. 5, 1996

[54] REAR WINDOW SHADE WITH WINDOW MOUNTING SUCTION CUPS

[75] Inventor: Arie Shikler, Woodland Hills, Calif.

[73] Assignee: Auto-Shade, Inc., Moorpark, Calif.

[21] Appl. No.: 330,116

[22] Filed: Oct. 27, 1994

Related U.S. Application Data

[63] Continuation of Ser. No. 172,602, Dec. 21, 1993, abandoned.

[51] Int. Cl.$^6$ ...................................................... B60J 1/20
[52] U.S. Cl. .................... 160/120; 160/DIG. 13; 160/370.22; 248/205.5; 296/97.8
[58] Field of Search ............................. 160/370.2 A, 120, 160/DIG. 13; 248/205.8, 206.3, 205.5; 296/97.8, 97.9

[56] References Cited

U.S. PATENT DOCUMENTS

| | | | |
|---|---|---|---|
| 2,561,188 | 7/1951 | Ferguson | 160/370.2 A X |
| 3,240,461 | 3/1966 | Singleton | 248/205.8 |
| 4,749,222 | 6/1988 | Idland . | |
| 4,762,358 | 8/1988 | Levosky et al. | 160/370.2 A X |
| 4,869,542 | 9/1989 | Lin | 160/370.2 A X |
| 5,036,898 | 8/1991 | Chen | 160/370.2 A X |
| 5,085,473 | 2/1992 | Yang | 160/370.2 A X |
| 5,135,279 | 8/1992 | Beatty | 160/370.2 A X |

Primary Examiner—Blair M. Johnson
Attorney, Agent, or Firm—Blakely Sokoloff Taylor & Zafman

[57] ABSTRACT

A window shade that can be applied to the rear window of an automobile by a pair of suction cups. The window shade includes a pair of shades that can be pulled from a rod. The suction cups are connected to the rod by brackets that are pivotally connected to corresponding rod clamps. The suction cups are screwed into the brackets and can be adjusted to any window shape. The clamps can slide along the length of the rod. Having a pair of pivoting adjustable cups along with a pair of corresponding sliding clamps, provides a window shade that can be mounted to a variety of different window sizes and shapes.

4 Claims, 2 Drawing Sheets

REAR WINDOW SHADE WITH WINDOW MOUNTING SUCTION CUPS

This is a continuation of application Ser. No. 08/172,602 filed on Dec. 21, 1993, now abandoned.

BACKGROUND OF THE INVENTION

1. Field of the Invention

The present invention relates to a window shade that can be readily applied to the rear window of an automobile.

2. Description of Related Art

Direct sunlight into the passenger compartment of an automobile can both heat the compartment and reduce the visibility of the occupants. Additionally, headlight glare may also reduce the visibility of the driver. To increase the comfort of driving, there has been developed window shades that can be attached to an automobile vehicle to reduce the amount of sunlight that enters the passenger compartment of the car.

U.S. Pat. No. 4,749,222 issued to Idland, discloses a window shade constructed from polyvinyl material which can be stuck to the surface of the window. The Idland shade has a plurality of opaque lines that are separated by transparent portions. The alternating opaque and transparent portions reduces the amount of direct sunlight while allowing the occupants to view through the window shade. Although the Idland shade is effective in reducing direct sunlight, the adhesion properties of the polyvinyl material degrades over time, particularly if the shade is exposed to dirt and is repeatedly applied to the window.

U.S. Pat. No. 4,758,041 issued to Labeur; U.S. Pat. No. 4,898,224 issued to Woodworth; U.S. Pat. No. 3,412,506 issued to Shiota; U.S. Pat. No. 3,363,666 issued to Hodgson et al.; U.S. Pat. No. 5,076,633 issued to Hsu et al. and U.S. Pat. No. 5,042,866 issued to Cody also disclose window shades that extend from curtain rods which are permanently fastened to the passenger compartment of the car. The permanent nature of the mounting equipment is sometimes undesirable, particularly if the owner of the vehicle no longer desires to have the window shade. Additionally, the prior art window shades must either be installed at the factory or require substantial post-factory assembly. It would be desirable to have a window shade that can applied to an automobile without modifying the vehicle. It would also be desirable to have a window shade which can be applied to various automobile makes and models.

SUMMARY OF THE INVENTION

The present invention is a window shade that can be applied to the rear window of an automobile by a pair of suction cups. The window shade includes a pair of shades that can be pulled from a rod. The suction cups are connected to the rod by brackets that are pivotally connected to corresponding rod clamps. The suction cups are screwed into the brackets and can be adjusted to any shape of rear windshield. Having a pair of pivoting adjustable cups along with a pair of corresponding sliding clamps, provides a window shade that can be applied to a variety of different window sizes and shapes.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
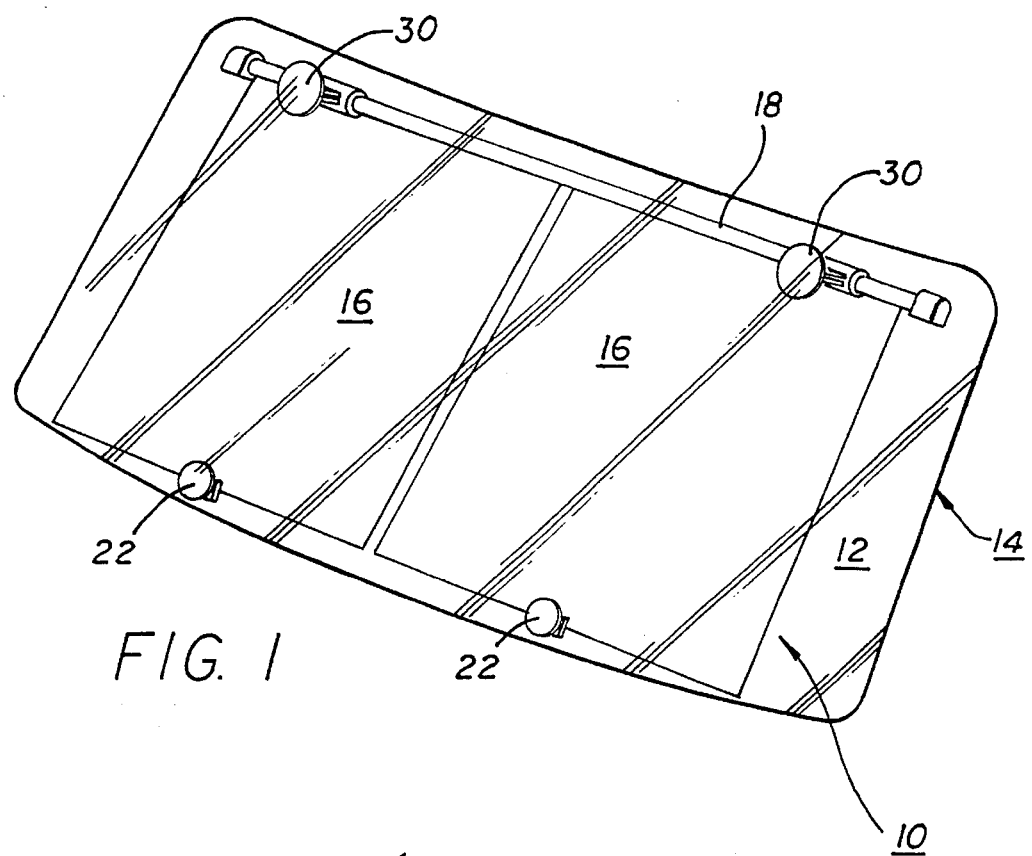
FIG. 1 is a perspective view of a window shade of the present invention mounted to a rear window of an automobile.

Referring to the drawings more particularly by reference numbers, FIG. 1 shows a window shade 10 of the present invention. The window shade 10 is typically mounted to the rear window 12 of an automobile 14. The window shade 10 has a pair of shades 16 that can be pulled from a rod 18. In the preferred embodiment, the shades 16 are each constructed from an opaque material which has a plurality of transparent circular areas that allow the occupants of the vehicle to see through the shades 16. The shades 16 are typically constructed to cover at least a significant amount of the window. Although two shades 16 are described and shown, it is to be understood that the window shade 10 may be constructed with a single shade.

Figure 2:
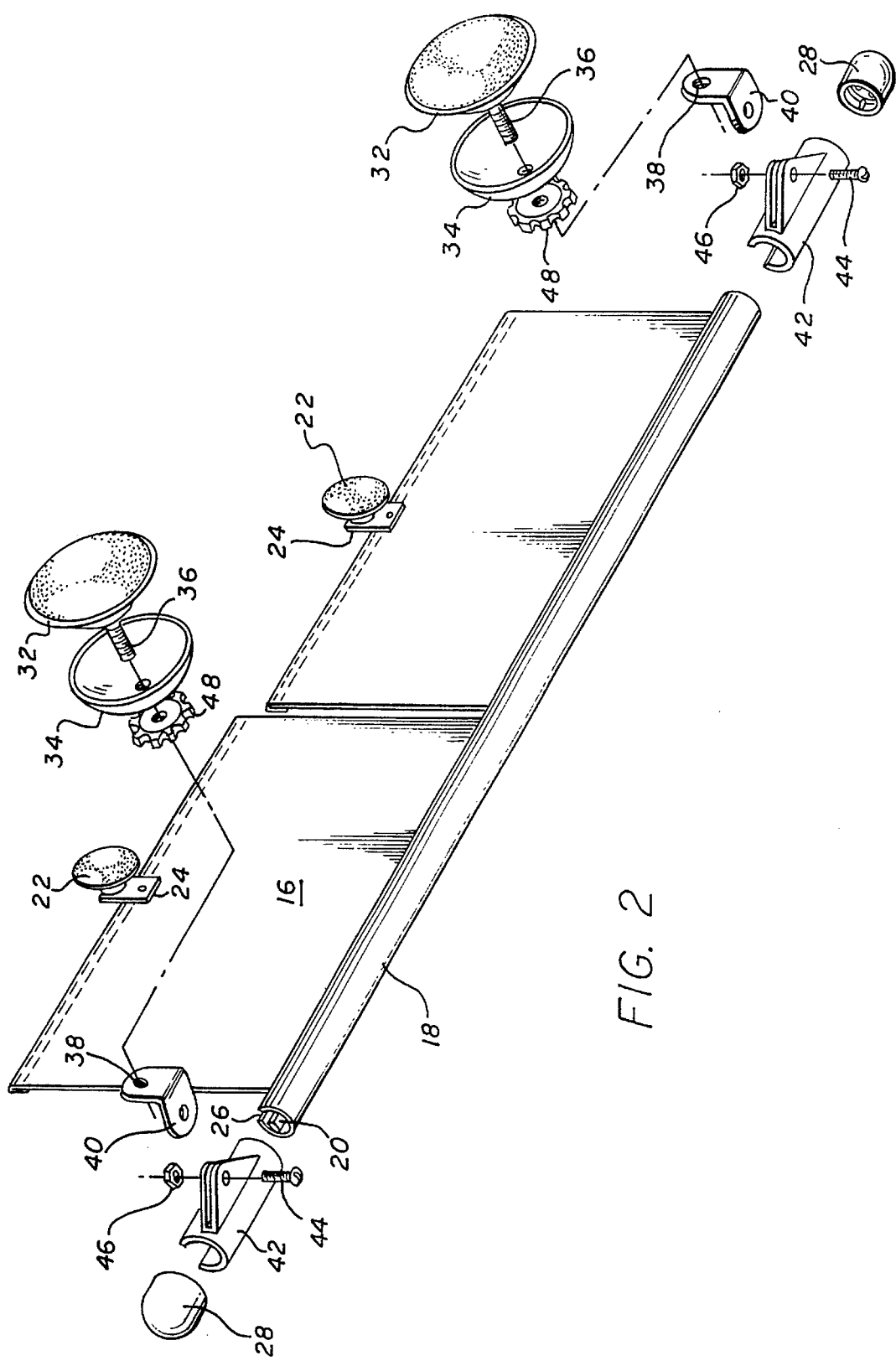
FIG. 2 is an exploded view of the window shade.

As shown in FIG. 2, each shade is wrapped around a spring loaded curtain rod 20 that is located within the rod 18. The spring loaded rods 20 bias the shades 16 to a rolled position. Each shade 16 has a shade suction cup 22 which can be pressed onto the window 12 to hold the shade 16 in a pulled position. The window suction cups 22 are preferably constructed from a hard rubber and have stems (not shown) that are pressed through tabs 24 which extend from the shades 16.

The rod 18 is typically an extruded hollow metal tube which has a slot 26 that allows the shades 16 to be pulled therethrough. The curtain rods 20 are captured by a bushing (not shown at the center of the rod 18 and a pair of end caps 28 that are pressed onto the tube 18. The end caps 28 and bushing are preferably constructed from plastic to reduce the cost of the product.

Figure 3:
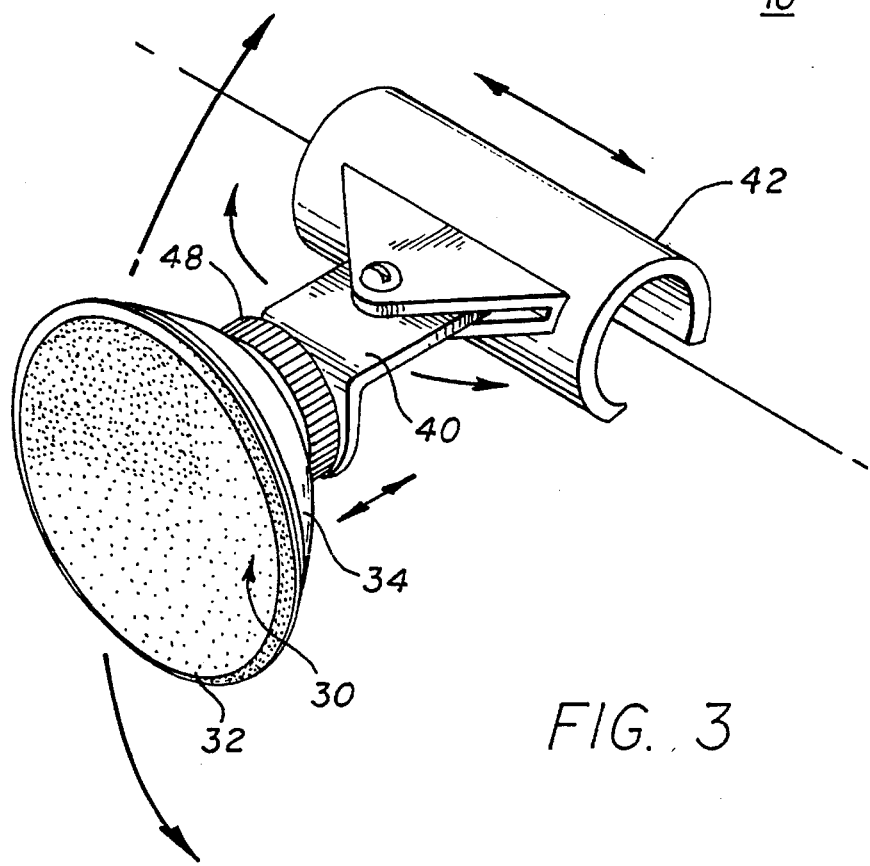
FIG. 3 is an enlarged view of a suction cup mounting assembly.

As shown in FIG. 3, the window shade 10 has a pair of suction cups 30 which can be pressed onto the window 12. The suction cups 30 are preferably constructed with a rubber cup 32 that is attached to a plastic shell 34. As shown in FIG. 2, The suction cups 30 each have a threaded shaft 36 that screws into a corresponding threaded aperture 38 of a bracket 40. The bracket 40 is pivotally connected to a clamp 42 by screws 44 and nuts 46. Located between each bracket 40 and the suction cup 30 is a lock nut 48. The clamp 42 is preferably constructed from plastic, the bracket 40, screws 44 and nuts 46 are preferably constructed from metal. The lock nut 48 is preferably constructed from plastic and has an internal threaded bushing (not shown) which can screw onto the threaded shaft 36 of the suction cup 30.

The amount of cup 30 extension from the rod 18 can be varied by screwing the threaded shaft 36 into or out of the bracket 40. The lock nut 48 is screwed onto the bracket 40 to lock the suction cup 30 in place. The outward adjustment of the suction cups 30 and the pivotal adjustment of the bracket 40 allows the user to move the cups to conform with the shade to the contour of the window 12. The sliding feature of the clamps 42 allows the cups to be laterally adjusted so that the window shade 10 can be attached to car windows 12 having different widths.

The window shade 10 of the present invention can be readily mounted to the rear window of an automobile by merely pressing the suction cups 30 onto the window surface. The various adjustment features of the cups provided a window shade that can be adapted to the surface contour of various windows.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A window shade for an automobile window, comprising:
    a rod;
    a shade that can be pulled from said rod;
    a shade suction cup that is attached to said shade and which can be pressed onto the window;
    a clamp that can slide easily along said rod;
    a bracket pivotally connected to said clamp;
    a rod suction cup coupled to said bracket and adapted to be pressed onto the window such that said rod and said shade are mounted to the window;
    a shell disposed between the bracket and the rod suction cup; and
    a rotatable lock nut coupled to said rod suction cup such that rotation of said nut causes said rod suction cup to be locked in a different position relative to said bracket.

2. A window shade for a rear automobile window, comprising:
    a rod;
    a first shade that can be pulled from said rod;
    a second shade that can be pulled from said rod;
    a first suction cup attached to said first shade;
    a second suction cup attached to said second shade;
    a first clamp that can slide easily along said rod;
    a second clamp that can slide along said rod;
    a first bracket pivotally connected to said first clamp;
    a second bracket pivotally connected to said second clamp;
    a first rod suction cup connected to said first bracket and adapted to be pressed onto the window; and,
    a second rod suction cup connected to said second bracket and adapted to be pressed onto the window;
    a first and second shell disposed between respective brackets and rod suction cups;
    a first rotatable lock nut coupled to said first rod suction cup such that rotation of said first nut causes said first rod suction cup to be locked in a different position relative to said first shell;
    a second rotatable lock nut couple to said second rod suction cup such that rotation of said second nut causes said second rod suction cup to be locked in a different position relative to said second shell.

3. The window shade of claim 2 for a rear automobile window,
    wherein at least one of the first shade or the second shade is comprised of an opaque material having a plurality of transparent regions such that a view of an occupant of the automobile is not obstructed.

4. A window shade for an automobile window, comprising:
    a rod;
    a shade that can be pulled from said rod, said shade comprised of an opaque material having a plurality of transparent regions such that a view of an occupant of the automobile is not obstructed;
    a shade suction cup that is attached to said shade and which can be pressed onto the window;
    a clamp that can slide along said rod;
    a bracket pivotally connected to said clamp;
    a rod suction cup coupled to said bracket and adapted to be pressed onto the window such that said rod and said shade are mounted to the window;
    a shell disposed between the bracket and the rod suction cup; and
    a rotatable lock nut coupled to said rod suction cup such that rotation of said nut causes said rod suction cup to be locked in a different position relative to said bracket, said lock nut being rotatable when the rod suction cup is adhered to a surface.

* * * * *